Sept. 24, 1946.   P. PEILLON   2,408,175
ELECTRIC UNDERWATER WELDING
Filed March 29, 1943   2 Sheets-Sheet 1
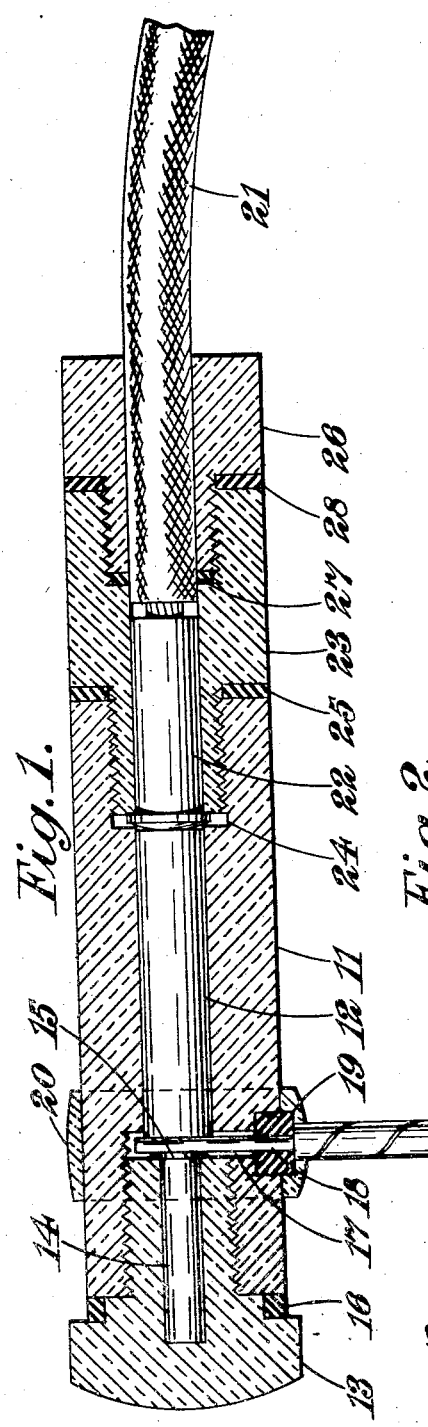
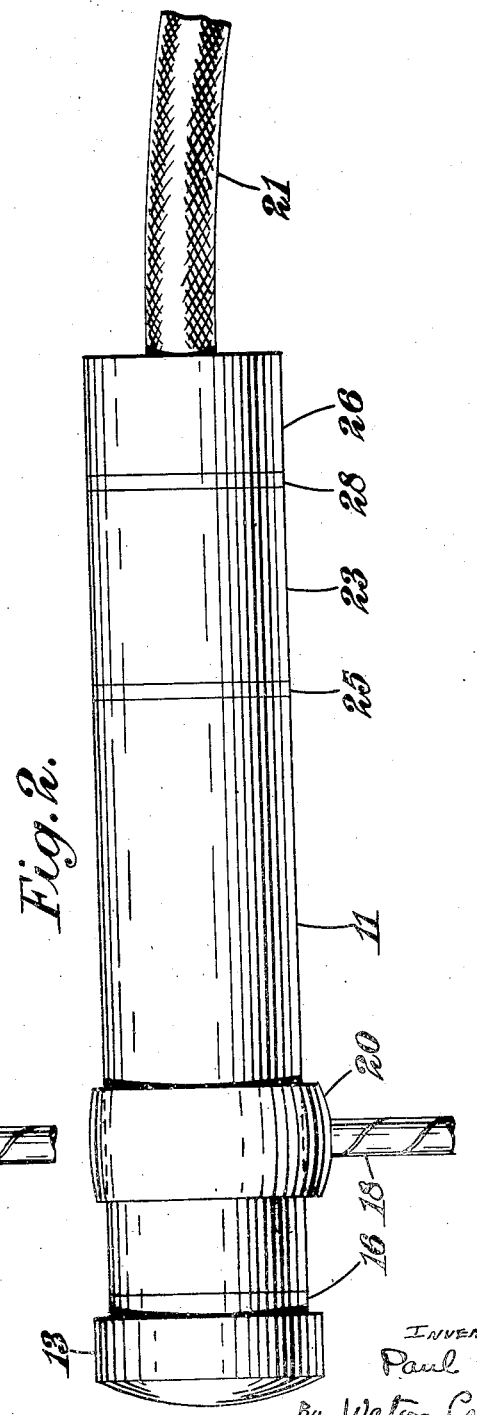
INVENTOR
Paul Peillon
By Watson, Cole, Grindle
& Watson
ATTYS Sept. 24, 1946.　　　　P. PEILLON　　　　2,408,175
ELECTRIC UNDERWATER WELDING
Filed March 29, 1943　　　2 Sheets-Sheet 2
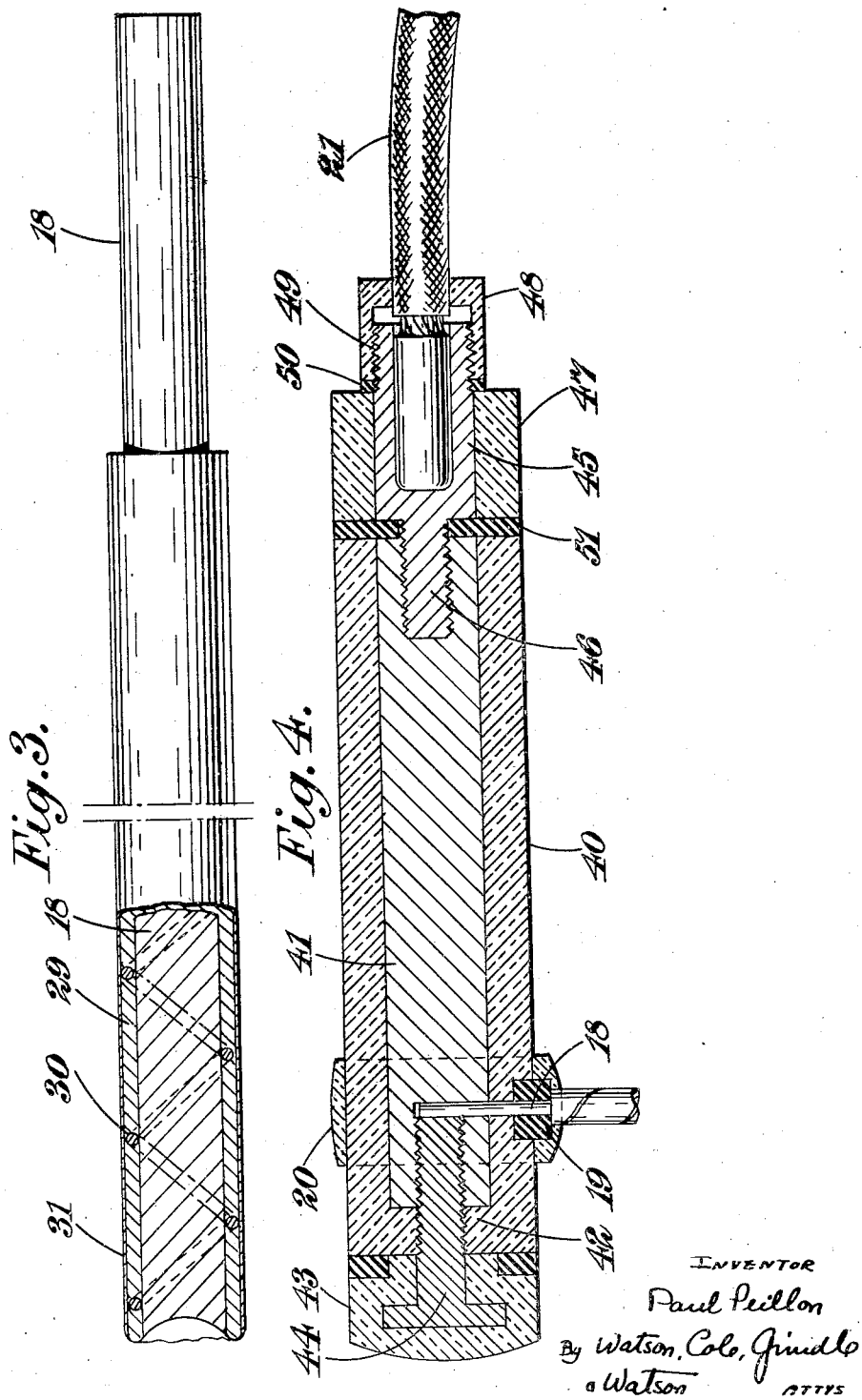

Patented Sept. 24, 1946

2,408,175

UNITED STATES PATENT OFFICE 2,408,175

ELECTRIC UNDERWATER WELDING

Paul Peillon, Cairo, Egypt, assignor to Salvage & Marine Company of Egypt S. A. E., Cairo, Egypt, an Egyptian company Application March 29, 1943, Serial No. 481,023
In Great Britain October 23, 1942

6 Claims. (Cl. 219—10)

This invention comprises improvements in or relating to electric underwater welding.

It has long been known that an electric arc can be maintained under the surface of water from a metallic electrode and this phenomenon has been utilised for the production of colloidal suspensions of metals in water. Attempts have been made to carry out electric arc-welding beneath the surface of water but hitherto without substantial success. It is an object of the present invention to provide a process of underwater electric arc-welding which can be carried out with practical success even in sea water and that may be used, for example, in the repair of ships without necessitating the ships being placed in dry dock, as well as for numerous other applications wherever engineering work needs to be conducted beneath the surface of a body of water.

We have found that in order to secure success in undersea electric arc-welding it is essential to devote particular attention to the covering on the electrode and according to the present invention the process is characterised by the fact that the electrode is coated, over its flux covering, with a water-excluding insulating coating in intimate contact with the flux, whereby the welding arc may be maintained stable beneath the surface of and in immediate contact with the water.

Many experiments on the nature of the insulating coating of the flux on the electrode have shown the inventors that it must be such as will be resistant to sea water and enter into such intimate contact with the surface of the flux as totally to exclude water from the flux itself and that these conditions are best secured by applying the insulating coating to the electrode in liquid form and solidifying it in situ. However, not all such coatings are suitable for the purpoese in view. Coatings of materials which are readily decomposed under the effects of the heat of the arc tend to deposit carbon in the weld and any undue production of carbon from the coating must therefore be avoided. Some resinous bodies which have been tried are decomposed under the influence of the heat of the arc and are not satisfactory. On the other hand organic insulating bodies which are capable of being vaporised without undue decomposition are found not only to obviate the deposit of the carbon in or on the weld, but also to form a body of vapour or fume which assists in protecting the welding point from the action of the water and to produce a purer and softer weld.

It is furthermore desirable that the coating should be of a water-repellent character and wax or wax-like bodies are indicated by this requirement. The most satisfactory body which has been discovered is paraffin wax. This has the further advantage that the electrodes can readily be coated by dipping them, after they have been coated with the flux, in molten paraffin wax, which is then allowed to solidify, whereupon the electrode is ready for immediate use. The paraffin wax penetrates to a certain extent into the body of the flux and makes an effective water-repellent insulating coating on and in the surface of the flux, which coating, in use, is vaporised near the welding point by the heat of the arc and assists in maintaining effective reducing conditions in the arc and protecting the welding point from the action of the water. Moreover, the volume of gases which tend to bubble away through the water from the arc is minimised by the use of a body of this character and the production of sound welds is facilitated.

Other waxes or wax-like bodies which can be employed are tallow, or spermaceti wax, ozokerite and montan wax.

Other classes of bodies which can be employed with success and which are capable of being vaporised without undue decomposition are drying oils, such for example as linseed oil. These can also be applied by dipping the electrodes in the liquid and then allowing them to drain, and to dry by oxidation in the air. A second dipping is usually necessary.

The invention accordingly includes a process of underwater electric arc-welding wherein the insulating coating over the flux on the electrode employed consists of a solid organic insulating body which has been applied to the flux coating on the electrode in liquid form and solidified in situ and which is capable of being vaporised without undue decomposition, and wherein the heat of the arc is employed to remove the coating progressively as the electrode burns away and to form a body of vapour or fume which assists in protecting the welding point from the action of the water without producing substantial deposit of carbonaceous material in or on the weld.

While primarily intended for welding under the surface of the sea, the electrodes can also be used with success in fresh water, which, being non-conducting, offers less difficulties.

Preferably the arc is a direct-current arc with the electrode connected to the positive supply-line.

The invention includes not only the process but also the electrodes when coated as hereinabove described.

The invention is preferably practiced with the aid of apparatus for undersea electric arc-welding comprising an electrode-holder having a case which is externally completely insulating and water-excluding, a water-resistant supply-cable which enters the casing by a water-excluding joint, a terminal within the casing electrically connected to the cable, a water-tight gland for insertion of the electrode into the holder so as to engage the terminal, and an electrode coated as hereinabove described, one end of which is adapted to be inserted into the holder through said gland.

With regard to the flux coating on the electrode this may be of one of the known types but should be selected with a view to maintaining the stability of the arc and is preferably somewhat thicker than may be employed for welding in the air. As the flux is protected by the paraffin wax or other coating on the electrode from the action of the water it is preserved during the process from any loosening which would otherwise occur, especially in sea water, due to electrolysis. The material of the electrode may be steel of various compositions, when, as is usual, the welding of steel plates is in question, and should be selected with a view to securing as soft a metal deposit in the weld as possible bearing in mind the tendency of the water to quench the deposited metal so that it is cooled more rapidly than usual.

The following is a description by way of example of certain forms of apparatus adapted for carrying the invention into effect, of an electrode for use therein and of the process carried out thereby:

In the accompanying drawings—

Figure 1 is a longitudinal section through an electrode holder showing part of an electrode clamped in position therein.

Figure 2 is an external view of the same.

Figure 3 is a side elevation partly in longitudinal section of an electrode in accordance with the invention, and Figure 4 is a longitudinal section of a second form of electrode holder.

Referring to Figure 1, the electrode holder comprises a case 11 which forms a handle and is made of thick Ebonite into which is moulded a central conducting core 12 which forms a terminal. Into the casing 11 there is screwed at one end an ebonite cap 13 which contains a metal clamping plug 14, completely surrounded by and insulated by the cap except for the end portion 15 which faces the end of the terminal 12. When the clamping plug 13 is screwed home a watertight joint is secured by means of a soft rubber gasket 16.

In the side of the handle 11 opposite the end of the terminal 12 there is an aperture 17 for the insertion of the electrode 18 which can be clamped firmly against the core 12 by the clamping plug 14. In order to make a watertight joint between the stem of the electrode and the casing 11 there is provided a soft rubber sleeve 19 which fits in a recess in the side of the handle 11 and is held in place by a soft rubber retaining band 20 which surrounds the handle and has an aperture to fit against the sides of the electrode 18 where it projects from the handle. The soft rubber plug 19 and the retaining band 20 constitute a gland in the side of the holder which excludes water. Even although, when the electrode has been withdrawn, if this is done under the sea, the water can penetrate into the space between the end of the cap 13 and the core 12, such water will not, after another electrode has been inserted, be in electrical connection with water surrounding the holder and therefore will not be subject to electrolytic action.

In order to convey the electric current, which is to be supplied to the electrode 18, to the core 12, there is provided a rubber covered cable 21 which is soldered to a metal sleeve 22 and the metal sleeve is forced against the core 12 by means of a screwed ebonite plug 23 which enters a screwed recess 24 in the back of the handle 11. A watertight joint is effected by means of a soft rubber washer 25 between the plug 23 and the handle 11. Furthermore there is a screwed gland member 26 which surrounds the rubber cable 21 closely and which serves to compress a rubber packing washer 27, located within the plug 23 firmly on to the rubber cable 21. Water is further excluded by a soft rubber washer 28. All the parts 11, 23 and 26 are of hard ebonite and the washers between them are of soft rubber.

Figure 3 shows the electrode 18 in detail. This comprises an iron wire core 18 which may be, say, 5 millimetres in diameter, and is covered with flux 29 keyed in place between the usual spiral winding 30 of wire or yarn. Over the coating of the flux 29 is a thin coating 31 of paraffin wax which has been applied by dipping the electrode in the hot molten paraffin wax, removing it and allowing it to drain and cool. In a particular case the electrode was of the kind sold by the Murex Co. under the trade name "Ironex." The iron wire was a low-carbon mild steel containing 0.18% carbon.

The flux coating 29 comprised asbestos, iron oxide, silicate of soda and small quantities of other compounds.

The thickness of the flux coating was about one millimetre or a little more. The spiral winding 30 consisted of a thin steel wire of the same composition as the electrode 18 and the coating 31 consisting of paraffin wax had a thickness over and above the original thickness of the flux of 0.1 millimetre. In addition it will be appreciated that the coating 31 penetrated to a certain extent into the outer portion of the substance of the flux 29.

Referring now to Figure 4, which shows an alternative construction of electrode holder, this comprises a heavy ebonite handle 40 in which is moulded an iron core 41. The ebonite cover 40 extends around the end of the core 41 as shown at 42 and a cap 43 is provided which contains a metal screw 44, screwed through the ebonite holder 42 into the core 41. The screw 44 constitutes a clamping plug and serves to engage the electrode 18 which enters through a hole drilled in the side of the handle 40 which hole is extended through the core 41 instead of lying beyond the core as in the case of the construction of Figure 1. The electrode 18 passes through a gland 19 and the retaining band 20 as in the case of the construction of Figure 1. The supply cable 21 is sweated into a thimble 45 which has a screwed stem 46 to enter a screw hole in the opposite end of the core 41 from that which is entered by the plug 44. The thimble 45 is insulated by an ebonite sleeve 47 and a watertight joint between the thimble and the end of the rubber covering of the cable 21 is ensured by a gland nut 48 which fits the cable closely, is screwed at 49 over a screw-threaded extension of the thimble 45 and bears against a soft rubber washer 50 on the back of the sleeve 47. A watertight joint is ensured between the sleeve 47 and the handle 40 by means of a soft rubber packing washer 51.

In use, with this apparatus, the operator, clad in a diving suit and with rubber gloves, is able to work under water. The electrodes 18 can be changed in the holder 11 or 40 as the case may be while under water owing to the watertight nature of the joints between the electrode and the holder and between the caps 13 or 43 and the holder. The electrode is applied to the work in the usual way for welding but the operator must maintain a somewhat shorter arc than is usual for welding in the air. The electrode coating 31 effectively resists the action of sea water and electrolysis of a detrimental kind such as would waste the electric current and loosen the flux coating 29 is entirely obviated. In order to maintain a suitable arc not only must the arc be kept shorter than when working in air but a current larger by about 20% for the same size of electrode must be employed. The vaporising of the coating 31 which takes place along with the consumption of the flux coating 29 ensures the maintenance around the arc of a region of reducing gases which keep the water from direct contact with the molten metal for a sufficient time to ensure the making of a proper weld even in places where considerable depth of penetration is required, and plates of considerable thickness such as are required for the under-bodies of ships, can be welded with facility. Repeated applications of welding metal to thicken the weld are possible. The operator does not obtain an equally clear view of the arc when welding under water compared with welding in the air but it may be desirable that his eyes should be shielded by darkened glass as in the case of welding in the air. The operator requires practice and to a certain extent must work by touch.

In Figure 3, the shape of the crater in the electrode is shown approximately at the left-hand end of the figure and it will be observed that the flux as well as the paraffin wax coating tends to shield a considerable part of the body of the arc from the water.

Although a hand-operated apparatus has been described and is capable of giving satisfactory results it is desirable that in suitable cases means should be provided for guiding the electrode in its progress along the work so as to facilitate the maintenance of a short arc of suitable stability, of maintaining a uniform rate of progress of the electrode over the work and of obviating the necessity of the operator touching the work with the electrode from time to time to assist him in maintaining the right length of arc and feeling the location of the weld.

With welds suitably carried out in accordance with the present invention the weld may be stronger than the strength of the plates which are united. The metal is not hardened so as to prevent it from having a satisfactory ductility in being capable of standing up to severe bending tests. The fact that the body of the work is kept cool by its direct contact with the water tends to prevent deformation of the work by the heat of welding and is an advantage. Welding can be effected at any depth up to the maximum at which a diver can work.

I claim:

1. A process of underwater arc welding which includes the steps of immersing in the body of water in which the metallic object to be welded is situated, an electrode comprising a metal steel core having an electrically non-conducting flux coating thereon, and an organic electrically insulating water-repellent covering layer for said flux coating and impregnated into the outer portions of said coating, said covering layer consisting of a material selected from the group consisting of waxes and drying coils, and applying to the electrode a welding current of the order of 20% in excess of that which is normal for welding in air with an electrode of the same size, and wherein the heat of the arc is employed to remove said water repellent coating material progressively as the electrode burns away.

2. A process as claimed in claim 1 wherein the covering layer on the electrode used consists of solidified paraffin wax.

3. A process as claimed in claim 1 wherein the covering layer on the electrode used consists of linseed oil.

4. An underwater arc welding electrode, especially adapted for use in sea water, said electrode comprising a steel rod having a solid, electrically non-conducting flux coating thereon, a separate covering layer superposed on and impregnated into the outer portion only of said flux coating, said covering layer consisting of an organic electrically insulating water-proof material capable of being vaporized by the welding heat, without undue decomposition or the production of carbonaceous matter to form a body of vapor protecting the welding zone from the action of the water, said material being selected from the group consisting of waxes and drying oils.

5. An underwater welding electrode as set forth in claim 4 in which the covering layer consists of solidified paraffin wax.

6. An underwater welding electrode as set forth in claim 4 in which the covering layer consists of linseed oil.

PAUL PEILLON.